J. E. HELLER.
EXTRUDING MACHINE.
APPLICATION FILED JAN. 3, 1920.
1,422,356.
Patented July 11, 1922.
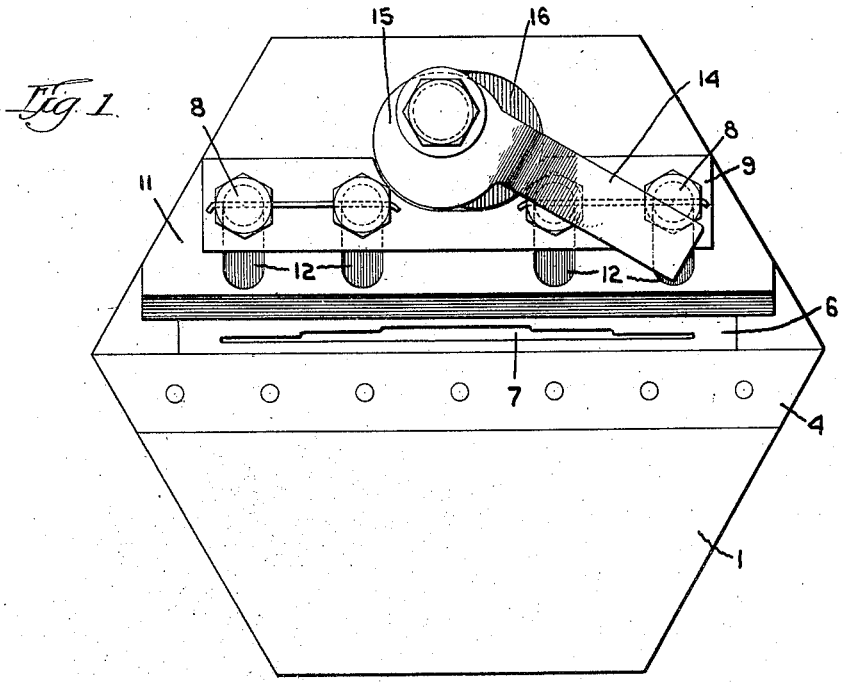
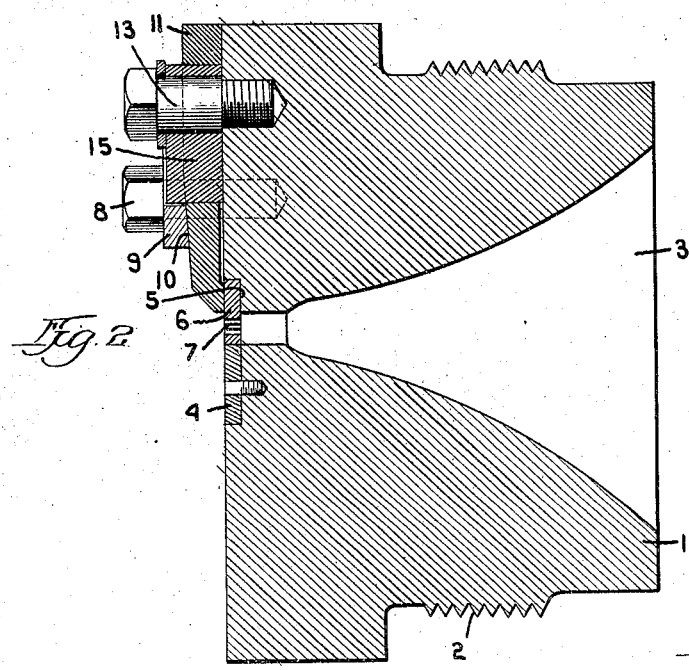
Witness:
Inventor
Jacob E. Heller

UNITED STATES PATENT OFFICE.

JACOB E. HELLER, OF AKRON, OHIO, ASSIGNOR TO THE FIRESTONE TIRE AND RUBBER COMPANY, OF AKRON, OHIO, A CORPORATION OF OHIO.

EXTRUDING MACHINE.

1,422,356.  Specification of Letters Patent.  Patented July 11, 1922.

Application filed January 3, 1920. Serial No. 349,311.

*To all whom it may concern:*

Be it known that I, JACOB E. HELLER, a citizen of the United States, residing at Akron, in the county of Summit, State of Ohio, have invented certain new and useful Improvements in Extruding Machines, of which the following is a specification.

This invention relates to dies for extruding material and while of general application, it is particularly designed and intended for use in dies for extruding rubber.

Dies which are used for rubber extruding purposes are heated in any approved manner, usually by an open gas flame, so that the rubber will be warmed sufficiently to be plastic. It frequently happens that particles of foreign matter become embedded in the rubber and upon reaching the narrow die opening interfere with the operation of the die and are required to be removed. Heretofore, the die plates have been attached to the face of the die by screws or bolts and the operation of removing the plate has been one consuming considerable time and as the workmen have been required to work over hot plates, the operation is not agreeable. As an alternative the whole die head may be removed from the machine. In either case the die has to be cleaned, and as the rubber has ceased to move through the heated die, it either burns or chills and its removal is quite difficult. Furthermore, quantities of rubber are spoiled and the machine must be shut down until the die can be cleaned or replaced.

The disadvantages outlined above are remedied by the attachment shown herein, it being the purpose of the invention to construct a die which can be easily and quickly cleaned of any foreign substance, will clean itself, and will require but a momentary stoppage of the extruding machine before it is ready to be used again. The handling of the heated parts is reduced to a minimum and there is no danger of burned stock.

These and other objects will become apparent as the description of the invention proceeds, it being understood that the showing made here is but one embodiment of the invention, other forms being possible without a departure from the essential elements of the improvement.

In the drawings:

Fig. 1 is a face view of the die.

Fig. 2 is a central longitudinal section through the die.

Referring to the drawings, 1 represents the removable die head which is of the usual form, being designed to be inserted in the machine by means of screw threads 2 and heated by any suitable device so that the rubber is plastic enough to be properly extruded. The die head is generally hexagonal in outline so that it may be screwed into a machine by a large wrench, and is provided with the usual tapered opening 3, through which the rubber passes as it is forced outwardly by the screw of the extruding machine.

On the front face of the die is secured a bearing plate 4, the upper surface of which is flush with the lower edge of the opening. In the front face of the die head surrounding the opening is a recess 5 in which is received a die plate 6 having a restricted central opening 7 corresponding to shape of the rubber strip to be extruded, being shown in the drawing of the shape to form tread strips.

In the front face of the die head are secured a plurality of bolts or pins 8 on which is mounted a plate or bar 9, the rear face of which is preferably formed with a slanting or inclined surface 10, spaced from the front face of the die head. Between the plate 9 and the front face of the die head is slidably mounted a locking plate 11, the rear face of which is vertical and the front face inclined to correspond to the rear face of the plate 9. The locking plate is provided with a plurality of slots 12, corresponding in number and location to the bolts 8 whereby the plate is guided in its vertical movement. The lower edge of the locking plate, when in its lowermost position, rests over the upper surface of the die plate and firmly locks it in position, the inclined surfaces referred to serving to force the plate firmly in its place.

Centrally located above the die opening is a pin or stud 13 on the smooth outer end of which is rotatably mounted an operating lever 14. The end of the lever is formed with a round eccentrically located head 15 which is received in an oval-shaped opening 16 in the plate 11. It will be seen that when the lever 14 is raised, the locking plate will be moved upwardly and will pass off the die plate, but when it is brought to its lowermost position, the wedge surfaces on the two plates 9 and 11 force the locking plate backward to firmly clamp the die plate in position.

In operation in the extrusion of tread strips or similar articles the parts are in the positions shown in the figures. Should a foreign substance become lodged within the narrow die openings, without stopping the operation of the extruding machine, the operator raises the lever 14 which immediately releases the die plate. The force of the rubber banked behind the die plate will forcibly eject it from its seat in the front of the die head, and it will be carried along on the stream of rubber until it is cut therefrom. The impulse of the stream of rubber, suddenly released in the manner described, will effectually clean out the opening in the die head and all of the foreign matter will be ejected. The die having been cleaned out, the action of the screw may be stopped momentarily, the die plate placed back in position, and locked by downward movement of the lever 14.

The removal and replacement of the die plate is done in a small fraction of the time formerly required. The rubber is not given enough time to burn within the die head, nor is the die allowed to cool to such an extent as to require reheating in order to loosen the rubber contained therein.

The advantages of my improved die construction will be at once apparent to those familiar with the art, and to those who have experienced the difficulties attendant upon the present methods of cleaning out clogged die openings it will be evident that the new device affords a quick, easy and effective method of relieving the difficulties.

It is obvious that changes and modifications may be made in the form of the invention, and it is understood that such as are within the scope of the invention are intended to be covered by the appended claims.

I claim:

1. In an extruding machine, a die head, a plate having a die opening therein, a locking device over the plate and a lever to move the locking device off the plate.

2. In an extruding machine, a die head, a die plate detachably mounted in said head, and means to instantaneously detach the die plate.

3. In an extruding machine, a die head, a die plate loosely mounted in said head, means to hold the plate in the head, and a single lever mechanism to move said holding means to release the die plate.

4. In an extruding machine, a die head having a passageway, a die plate seated in a recess around the mouth of the passageway, a locking plate over the die plate and means to move the locking plate off the die plate.

5. In an extruding machine a die head having a passageway, a die plate seated in a recess around the mouth of the passageway, a locking plate over the die plate, a lever and means connected with the lever for moving the locking plate.

6. In an extruding machine, a die head having a passageway, a die plate over the mouth of the passageway, a locking plate covering a portion of the die plate and holding it in position, a lever, and means connected with the lever for moving the locking plate.

7. In an extruding machine, a die head having a passageway, a die plate over the mouth of the passageway, a locking plate slidably mounted on the front of the die head, a portion of said locking plate covering a portion of the die plate, means for moving the locking plate over the die plate, the locking plate being provided with means for cramping the locking plate as it moves over the die plate.

8. In an extruding machine, a die head having a passageway, a die plate over the mouth of the passageway, a bar spaced from the front of the die head, a locking plate slidably mounted on the die head behind the bar, tapered surfaces on the bar and the locking plate, and means to move the locking plate so that it covers a portion of the die plate.

9. In an extruding machine a die head having a passageway, a die plate over the mouth of the passageway, a bar spaced from the front of the die head, a locking plate slidably mounted on the die head behind the bar, tapered surfaces on the bar and the locking plate, a lever mounted on the die head and means connected with the lever to move the locking plate.

10. In an extruding machine, a die head provided with a recess around the die opening, a die plate seated in the recess, a bar secured to the front of the die head, a locking plate between the bar and the face of the die head and guided for vertical movement, the lower portion of the locking plate being over the die plate when in its lowermost position, an inclined surface on the rear of the bar and a correspondingly inclined surface on the front of the locking plate, a lever pivoted on the front of the die head, an eccentric cam on the head of the lever which is received in an opening in the locking plate.

JACOB E. HELLER.